Patented Aug. 30, 1932

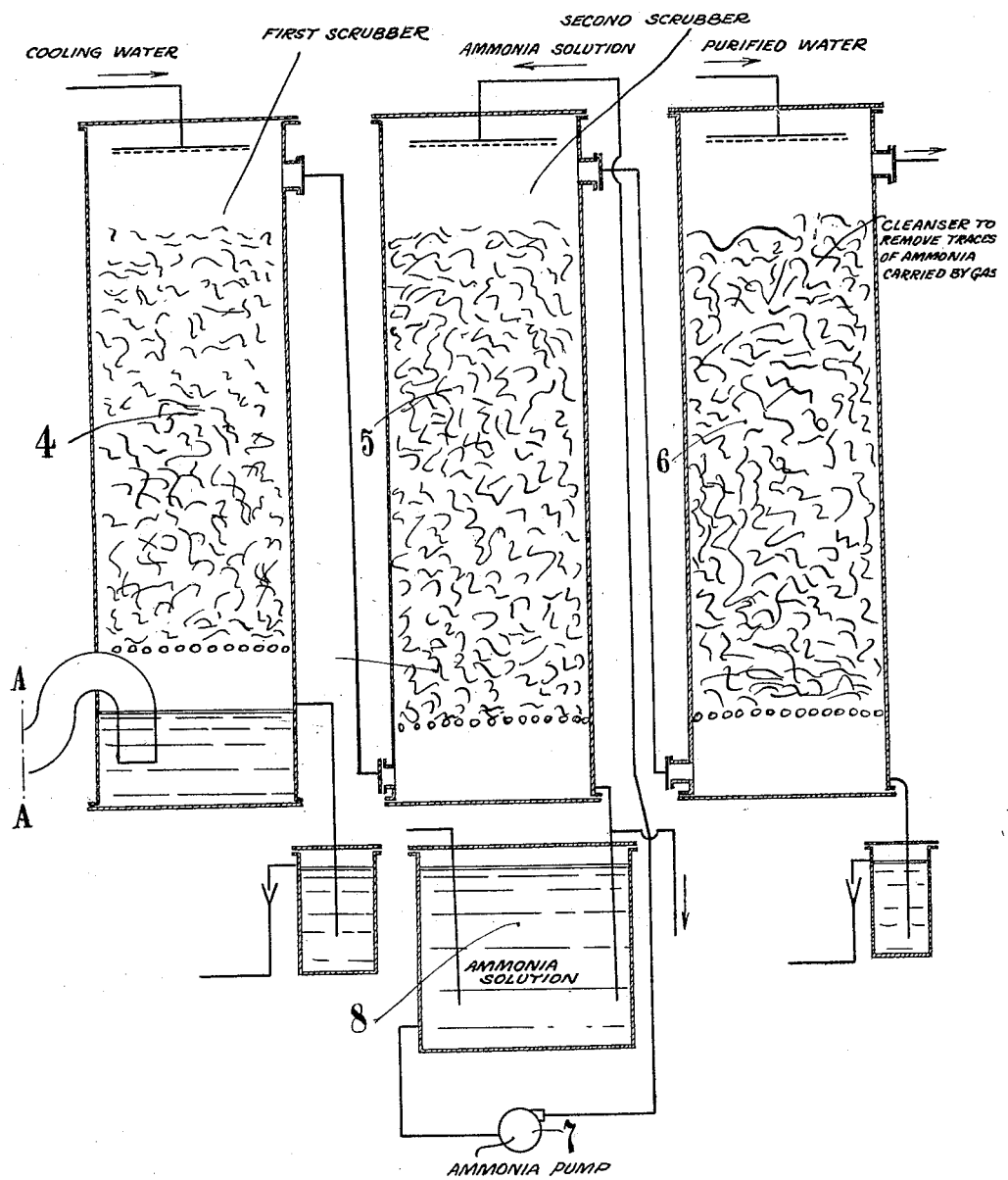

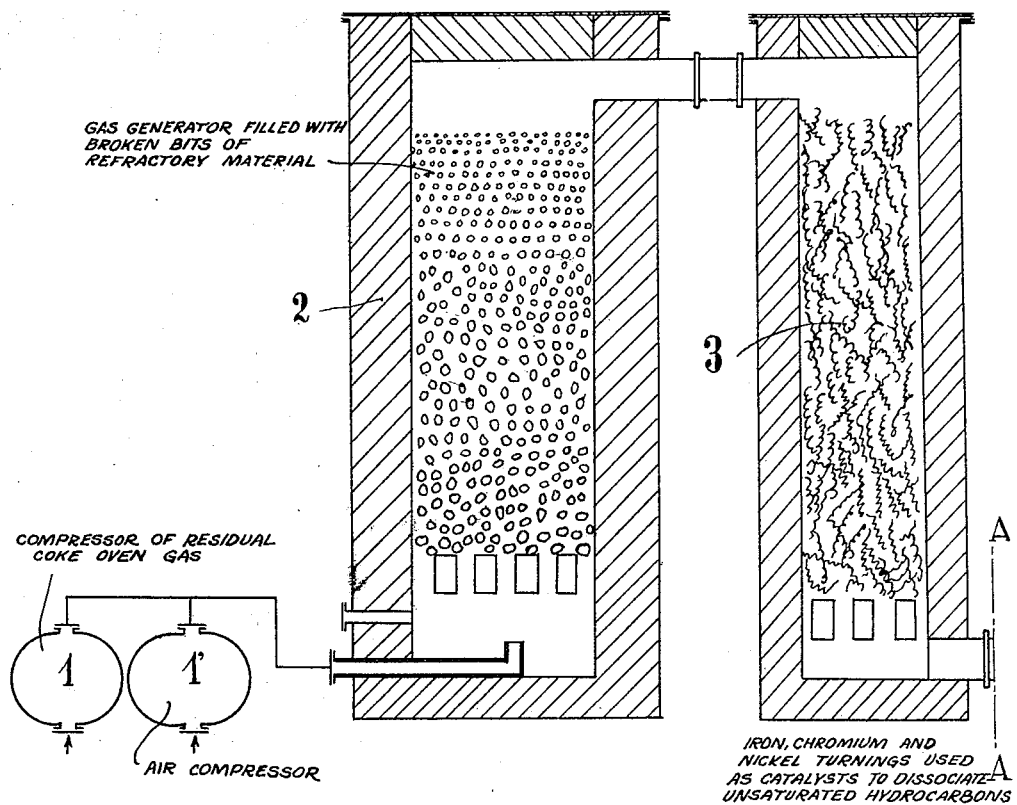

1,875,253

UNITED STATES PATENT OFFICE

MAURICE EUGENE HENRI MINOTTE, OF PARIS, FRANCE, ASSIGNOR TO COMPAGNIE DE BETHUNE, OF BULLY LES MINES, FRANCE, A CORPORATION OF FRANCE

PROCESS FOR PREPARING NITROGEN, CARBONIC OXIDE, AND HYDROGEN

Application filed June 21, 1929, Serial No. 372,771, and in France June 27, 1928.

The object of this invention is a new and useful process for preparing nitrogen, carbonic oxide and hydrogen in view of simultaneous synthesis of ammonia and of methyl alcohol from coke oven gases of which the following is a true, clear and complete specification.

Persons skilled in the art are aware that coke oven gas is nowadays an important raw material in the synthetic ammonia industry. Coke oven gas contains about 50% of hydrogen. According to some processes, said hydrogen is directly separated from the other gaseous constituents of the mixture called "coke oven gas" through liquefying by adequate refrigeration of all other gases. According to other processes operation is indirect, steam being decomposed by means of iron at a red heat, and, since iron retains oxygen, the coke oven gas is used only for reducing the iron oxide produced.

Persons skilled in the art are also aware that, with such processes, serious difficulty is experienced in obtaining hydrogen in a state sufficiently pure not to poison catalyzers, the latter being highly sensitive to any traces of unsaturated hydrocarbons, and, especially, of hydrocarbons of the acetylene type which may arise from coke oven gas itself.

The same stands true as concerns nitrogen intended to serve for preparing ammonia. Such nitrogen must be very pure too, and, therefore, the general practice is to prepare it, through combustion in air of part of the hydrogen produced and through condensing the combustion water, or else through liquefying and distilling atmospheric air.

Whether nitrogen is obtained by one or the other of said processes, its cost is high owing, in the first case, to the price of the hydrogen used for obtaining it or, in the second case, owing to the expenditure required for the air compressing operation and for plant maintenance.

With either of the processes above referred to for manufacturing hydrogen from coke oven gas, there remains a variously proportioned mixture of methane, ethylene, propylene, carbonic oxide, carbonic anhydride, nitrogen and also of a little residual hydrogen. Some of these gases may, however, have been partly or totally separated for the purpose of preparing other products or else for requirements of a technical order.

According to my invention, I have found that the mixture of residual gases is, through incomplete combustion conducted under certain conditions, suitable for manufacturing ammonia and methyl alcohol, after the required amount of hydrogen has been added thereto.

Complete combustion of the said gases, supposing it were properly conducted, would obviously produce carbonic acid, water and nitrogen. It would then be an easy matter to eliminate the water and the carbonic acid through processes well known in the art and nitrogen would remain. In practice, however, such a complete combustion is out of the question because of the frequent risk of operating with an excess of air and because there would then remain some oxygen mixed with the nitrogen obtained; furthermore, complete combustions are effected at very high temperatures that foster formation of oxides of nitrogen, which compounds are detrimental to later use of the gases obtained.

Incomplete combustion presents no such disadvantages. It has long been known that where hydrocarbon gases are burnt in an insufficient quantity of air, the resulting mixture contains nitrogen, carbon monoxide and water vapor with a little carbonic gas. However, the CO content is too high to be used in the synthetic preparation of ammonia and it becomes necessary to eliminate it, generally, by the action of water vapor upon the gaseous mixture in the presence of catalysts, or by combustion with an additional supply of air. Whatever the method used, the elimination of the CO in the form of $CO_2$ is always costly. In the process described hereinafter, the CO may be left in its entirety in the gaseous mixture.

My invention utilizes the residual coke oven-gases incident to the manufacture of hydrogen. The object thereof lies in the preparation, under certain conditions, of a gas having a high nitrogen content, free from oxidized compounds of nitrogen and non-saturated hydrocarbons, but containing from 10 to 15% of CO, and in the integral use of this gas in the simultaneous syntheses of ammonia and methyl alcohol. In the incomplete combustion mentioned above, the hydrocarbons are decomposed into carbon and hydrogen under the influence of heat, and experiments have shown that when only part of the hydrogen is oxidized, the whole carbon, on the contrary, is transformed into oxide of carbon, and a small amount of this CO is in turn oxidized to $CO_2$.

If no special precautions were taken, traces of nitrogen oxides would be found, though in quantities which would appear less important than in the case of complete combustion.

I have found it possible to preclude the formation of nitrous oxides during the course of the incomplete combustion, under conditions to be described hereinafter, although there remain immeasurable traces of non-saturated traces of hydrocarbons in the gases, particularly of the acetylene series, which are also objectionable in the catalysis of ammonia, and which it is easy to remove by dissociation at high temperature in the presence of iron, chromium or nickel filings, or better, of an alloy of all three metals.

The elimination of the carbonic gas is brought about in a well known manner, by washing with ammonia water, on the contrary, all of the CO remains as it was in the gases immediately after partial combustion, so that the cleansing of the gaseous mixture is very simple and consists merely in the elimination of the non-saturated hydrocarbons and of the carbonic gas.

When the correct conditions obtain under which the gaseous mixture having a high nitrogen content is produced, there will be formed nitrogen, hydrogen and carbon. Hydrogen is subsequently added in suitable quantities so that the hydrogen content of the final mixture shall be twice the CO content and three times the nitrogen content, in accordance with the following proportions:

$$CO + 2H_2$$
$$N_2 + 3H_2.$$

The final mixture is then compressed under a pressure of 900 atmospheres and is led at a suitable temperature through a first catalyzer causing synthetic formation of methyl alcohol:

$$CO + 2H_2 = CH_3OH.$$

After condensation and removal of the alcohol the mixture, still under the same pressure, is led to the apparatuses wherein synthetic ammonia is produced.

It will be seen, therefore, that the synthetic formation of methyl alcohol precedes that of ammonia, so that it is unnecessary, in this process, to eliminate all the CO contained in the mixture by transforming it to $CO_2$, and that all the constituents of the mixture are eventually changed into valuable products.

I will now describe the process and the plant for performing the same which are the objects of my invention, by referring to the sole figure of the drawing appended hereto.

The residual gas coming from the manufacturing of hydrogen from coke oven gas and blown by compressor 1, is mixed with a proper amount of air blown by compressor 1', and the mixture is injected into a tower or gas generator 2, filled with refractory material broken to tiny bits, and maintained at a high temperature by the reaction itself. The supply rate of the gaseous mixture is so adjusted that combustion will take place without any flaming at the gas generator inlet and will continue chiefly in the interstices of the refractory material with which the latter is furnished.

The hot gases pass next into tower 3 intended to destroy all traces of unsaturated hydrocarbons.

The gases are then cooled by means of a water sprinkling in a scrubber 4, after which they pass into another scrubber 5, sprinkled with an ammonia solution. An ultimate washing with purified water in a tower 6 dissolves the traces of ammonia carried by the gas.

A pump 7 circulates the ammonia solution which passes through a trough 8 whereinto fresh solution is fed in a continuous manner while the used solution is drained, also continuously, at any point of the circuit. Combustion is controlled mainly by regulating the relative proportions of gas and of air, and, correlatively controlling the temperature inside the gas generator. This temperature must not be lower than 1200° C. at the base of the refractory bricks so as to insure dissociation of the whole gas mixture. On the other hand, it must not be higher than 1300° C. so as not to produce oxide of nitrogen. For this purpose, we have but not to exceed in the gases issuing from the combustion tower a maximum $CO_2$ content, which will vary according to the composition of the initial gas, but will always be about 4 or 5% (analysis effected after steam condensation).

For example, with an initial gas composed as follows:

| | |
|---|---:|
| $CO_2$ | 0 |
| $O_2$ | 2.4 |
| $C_nH_m$ | 0.7 |
| CO | 7.5 |
| $H_2$ | 10.4 |
| $CH_4$ | 65 |
| $N_2$ | 14 |
| | 100.00 | the reaction should be so conducted as to obtain at the outlet of the combustion apparatus a gas composed as follows:

| | |
|---|---|
| $CO_2$ | 4.6 |
| $O_2$ | 0 |
| $C_nH_m$ | immeasurable traces |
| $CO$ | 11.8 |
| $H_2$ | 16 |
| $CH_4$ | 0 |
| $N_2$ | 67.6 |
| | 100.00 |

The mixture contains no trace of oxidized nitrogen compounds.

The traces of unsaturated hydrocarbons, and especially of acetylenic hydrocarbons, that may exist in the gas after combustion are eliminated by catalytic destruction at a high temperature in the presence of iron or nickel or chromium turnings, or, preferably, in the presence of an alloy made up of these three metals.

The gases are deprived of their $CO_2$ contents through washings with an ammonia solution and next with purified water in order to dissolve the ammonia carried along. The gases are then fit to be mixed with the hydrogen intended for the synthesis of methyl alcohol and next of ammonia.

Having now particularly ascertained and described the nature of my said invention as well as the manner in which the same is to be performed, I declare that what I claim is:

1. A process of obtaining a mixture of nitrogen, hydrogen and carbon monoxide from residual coke oven gases, which comprises mixing with the said gases a predetermined amount of air, causing incomplete combustion thereof in a gas generator filled with refractory material kept at a high temperature, controlling the combustion at a suitable temperature so as to prevent formation of nitrogen oxides and maintaining the carbon dioxide content of the gas mixture at about 4 or 5% by regulating the relative volumes of incoming air and coke oven gases, purifying the gaseous mixture thus obtained by eliminating the traces of non-saturated hydrocarbons through hot catalytic destruction and by absorbing the carbon dioxide in a wash of ammonia solution, and leaving in the residual gas mixture all of the carbon monoxide which was present in the gas generator.

2. In a process of simultaneously synthesizing methyl alcohol and ammonia from residual coke oven gases, the steps which comprise mixing with the said gases a predetermined amount of air, causing incomplete combustion thereof in a gas generator filled with refractory material kept at a high temperature, controlling the combustion at a suitable temperature so as to prevent formation of nitrogen oxides and maintaining the carbon dioxide content of the gas mixture at about 4 or 5% by regulating the relative volumes of incoming air and coke oven gases, purifying the gaseous mixture thus obtained by eliminating the traces of nonsaturated hydrocarbons through hot catalytic destruction and by absorbing the carbon dioxide in a wash of ammonia solution, and leaving in the residual gas mixture all of the carbon monoxide which was present in the gas generator.

In testimony whereof, I affix my signature.

MAURICE EUGENE HENRI MINOTTE.